Patented Jan. 31, 1928.

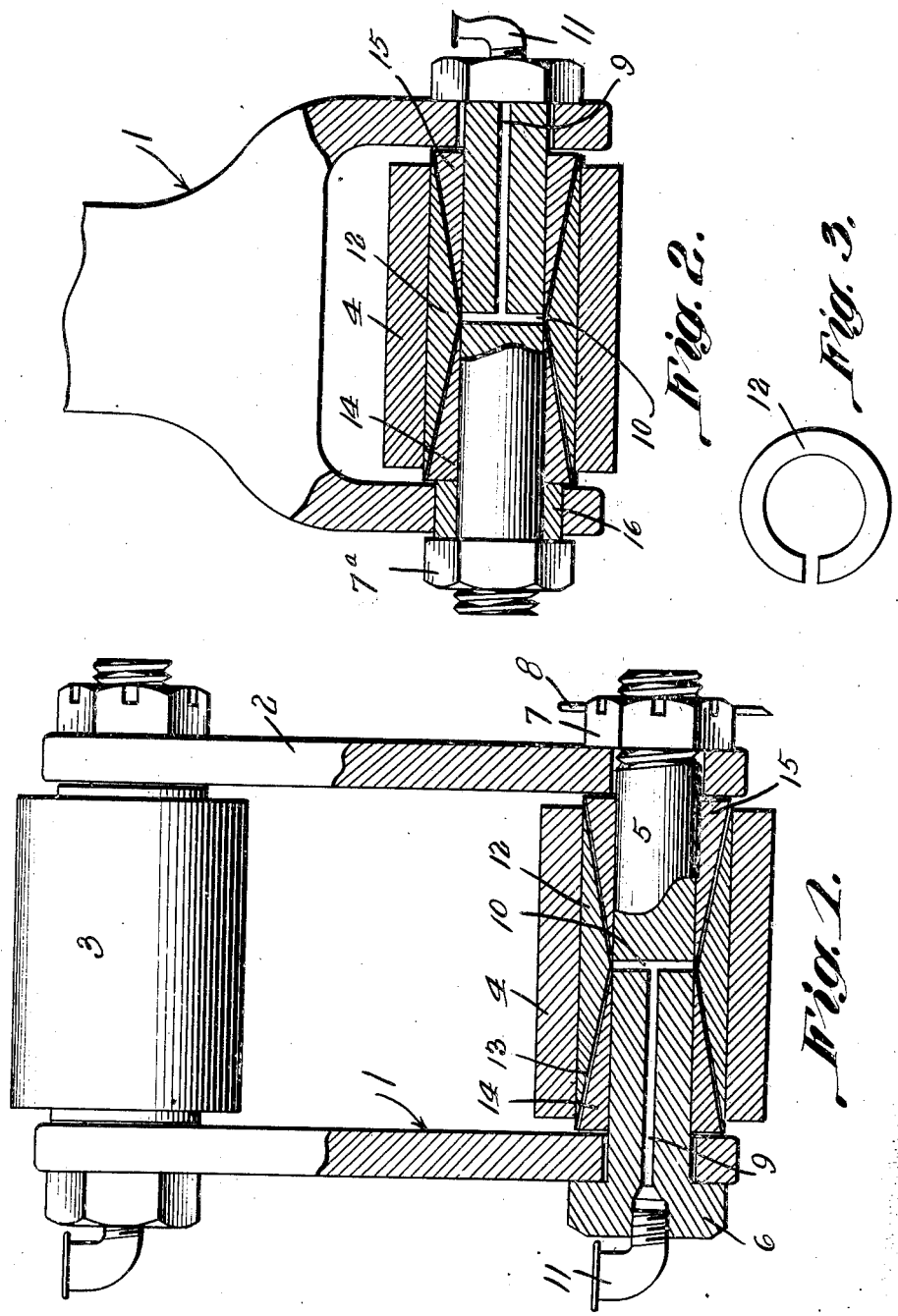

1,657,501

UNITED STATES PATENT OFFICE.

ERNEST R. GREGORY, OF GALVESTON, TEXAS.

ADJUSTABLE SPRING-SHACKLE BUSHING.

Application filed January 30, 1924. Serial No. 689,487.

This invention relates to adjustable spring and shackle bushings for automobiles, steering rods, spindle bodies and the like.

The object of the invention is to provide a bushing of this character so constructed as to obviate the necessity of the frequent changing of spring bolts and bushings.

Another object is to provide a bushing of this character whereby the tightening up of the nut on the shackle bolt will operate to adjust the bushing to take up all lost motion incident to wear.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Figure 1 represents an end elevation partly in section of a pair of spring shackles having this improved bushing applied.

Fig. 2 is a similar view showing a slightly different form; and

Fig. 3 is a detail transverse section through one of the bushings.

In the embodiment illustrated in Figure 1 a pair of spring shackles 1 and 2 are shown in the upper end of which is mounted a spring 3 and a similar spring 4 is carried by the lower ends thereof. Each of these springs is equipped with one of the improved bushings constituting this invention and which are constructed exactly alike. A bolt 5 extends through the lower ends of the shackles 1 and 2 and is equipped at one end with the usual head 6 and at the other end with a nut 7 held in operative position by a cotter pin 8. This nut 5 has lubricating bores 9 and 10 extending longitudinally and transversely therethrough respectively. An oil cup 11 is mounted in the outer end of the longitudinal bore 9 and the oil supplied therethrough passes through said bore 9 out through the transverse bore 10 for lubrication of the bushing which surrounds the bolt. The bushing comprises a steel sleeve 12, the inner face of which flares from its center toward its opposite ends as is shown clearly at 13. This sleeve fits tightly in the spring eye 4 and is of a length corresponding to the width of the eye, which width is of a length less than the distance between the shackles 1 and 2 to provide sufficient space to permit adjustment of the bushing. Mounted in the sleeve 12 are two bronze bushings 14 and 15 which taper from their outer faces and are made in the form of split bands or sleeves to provide for the closing thereof to take up wear. The outer ends of the bushings 14 and 15 are arranged in close proximity to the inner faces of the shackles 1 and 2 and when the nut 7 is screwed up the shackles will be moved toward each other and consequently will force the tapered or wedge-shaped bushings in the sleeve 12 and provide a tight connection between the bushings and the sleeve thus compensating for any wear or lost motion which may occur at these points. The transverse oil bore 10 opens at its ends directly opposite the crown or apex of sleeve 12 so that the oil flows in opposite directions between sleeve 12 and bushings 14 and 15.

In Fig. 2 the bushing is constructed exactly like the one shown in Fig. 1 except that a sleeve or bushing 16 is arranged in the opening in one of the shackles and is of a length greater than the thickness of the shackle so that when the nut 7ª is tightened this bushing 16 will be forced against the bronze bushing 14 causing it to move inward into close contact with the tapered face of the sleeve 12 in the same manner as that above described.

From the above description it will be seen that a bushing of this character will entirely eliminate the necessity of changing spring bolts and bushings which heretofore has been found necessary.

The bushings while shown applied to a spring may obviously be used in any other bearing.

Various changes in the form, shape, proportion and other minor details of construction may be made without departing from the principle or sacrificing any of the advantages of the claimed invention.

I claim:—

A spring shackle embodying spaced members having openings, a shackle bolt having a head at one end and having its opposite end threaded, said shackle bolt being positioned within the openings, the head contacting with one of the spaced members, said shackle bolt having a bore extending from one end thereof and terminating substantially intermediate the end of the bolt and having a transverse bore communicating therewith at the central portion of the bolt, tapered bushings mounted on the bolt and having their outer ends engaging the inner surfaces of the spaced members, a sleeve having its inner face flared from its center towards its opposite ends and fitted over the bushing, a spring adapted to be secured to the sleeve, and a nut on the threaded end of the shackle bolt for moving the spaced members into close engagement with the ends of the bushings.

In testimony that I claim the foregoing as my own, I have hereto affixed my signature.

ERNEST R. GREGORY.